United States Patent

[15] 3,649,939

[45] Mar. 14, 1972

Hildebrandt

[54] ELECTRICAL COMPONENT

[72] Inventor: Albert R. Hildebrandt, Cincinnati, Ohio

[73] Assignee: Standard International Corporation, Cincinnati, Ohio

[22] Filed: Jan. 13, 1970

[21] Appl. No.: 2,575

[52] U.S. Cl. ....... 336/65, 336/136, 336/192, 336/198, 336/205

[51] Int. Cl. ....... H01f 15/10, H01f 21/06

[58] Field of Search ....... 336/136, 192, 198, 205, 208, 336/65; 339/17 C, 220 C

[56] References Cited

UNITED STATES PATENTS

| | | | |
|---|---|---|---|
| 2,838,738 | 6/1958 | Antalek et al. | 336/136 |
| 2,941,172 | 6/1960 | Sutton, Jr. | 336/136 X |
| 2,958,063 | 10/1960 | Stanwyck | 339/17 C |
| 3,000,079 | 9/1961 | Howell et al. | 336/136 X |
| 3,138,771 | 6/1964 | Goldsmith | 336/136 X |
| 3,169,234 | 2/1965 | Renskers | 336/192 |
| 3,355,687 | 11/1967 | Adams | 336/192 X |
| 3,437,968 | 4/1969 | Hildebrandt | 336/136 X |
| 3,486,224 | 12/1969 | Chaney | 336/192 X |
| 3,496,503 | 2/1970 | Morris | 336/65 |

*Primary Examiner*—Thomas J. Kozma
*Attorney*—Joseph Weingarten

[57] ABSTRACT

An electrical coil adapted to be mounted on a circuit board and accurately secured in a predetermined position thereon during circuit assembly. The coil includes electrical leads each having a crimp formed therein and operative to positively seat the coil on a circuit board prior to soldering.

4 Claims, 6 Drawing Figures

INVENTOR
ALBERT R. HILDEBRANDT

BY Joseph Weingarten
Stanley M. Schwartz
ATTORNEYS

ELECTRICAL COMPONENT

FIELD OF THE INVENTION

This invention relates to electrical components and more particularly to coils such as RF coils and transformers adapted for mounting on and interconnection with a circuit board.

BACKGROUND OF THE INVENTION

In the fabrication of printed circuits, electrical components forming the circuit are generally incorporated into the circuit by inserting the component leads through holes provided on the circuit board and then soldering components to the board for example by means of a solder bath. Prior to the soldering operation, the components are movable within the mounting holes and, during circuit assembly, parts may be jarred or otherwise shifted from the desired position on the board. In the case of electrical coils, such as inductors and transformers, for example, movement of the coil from the desired position may cause variation in the intended electrical parameters, with consequent affect on the performance of the associated circuit. Such coils are generally larger and of a different aspect than other components such as semiconductors and resistors comprising the electrical circuit, and as a result these coils are more subject to spurious movement prior to soldering. Heretofore, such coils have been mechanically secured to the circuit board prior to soldering by means of additional mounting hardware, such as transition lugs or dummy leads which are formed during manufacture of the coil. Such mounting hardware adds to the cost of coil manufacture and, in addition, often requires additional steps during assembly operations to mechanically secure the coil to the circuit board.

SUMMARY OF THE INVENTION

In accordance with the present invention, an improved coil is provided in which the electrical leads also serve to mechanically support the coil in precise position on a circuit board and which does not require additional assembly steps in mounting the coil on the board. The coil includes a winding which is usually prewound to a desired configuration and supported on a plastic coil form which is molded around the preformed winding to provide a precise and rugged electrical component. The electrical leads are formed integrally with the winding itself and depend from the form, each lead including a crimp configured to provide positive mechanical support of the coil when inserted into a circuit board. The novel coil thus includes leads operative to securely maintain the coil in a predetermined position on a circuit board prior to soldering, in addition to providing electrical connection to the coil. The coil is easily mounted on the circuit board by insertion through mounting holes provided therein and, by action of the novel lead configuration, is securely maintained in proper position prior to soldering so that spurious movement of the coil relative to the board and to other components is substantially prevented. The electrical parameters of the mounted coil and those of the circuit in which the coil is employed, therefore, remain substantially constant by elimination of spurious coil movement during circuit fabrication.

DESCRIPTION OF THE DRAWINGS

The invention will be more fully understood from the following detailed description, taken in conjunction with the accompanying drawings, in which.

DETAILED DESCRIPTION OF THE INVENTION

Figure 1:
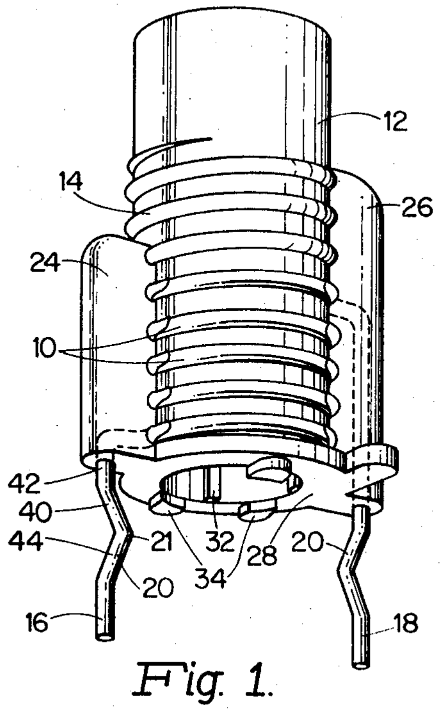
FIG. 1 is a pictorial view of a coil constructed according to the invention.

Referring to FIG. 1 there is shown a coil of improved construction and adapted for accurate retention in position on a circuit board without the use of additional mounting hardware. The invention includes a winding 10 of helically wound turns 11 of wire and supported by a tubular coil form 12 molded to winding 10 and having a helical groove 14 formed therein for the support of coil turns 11 in predetermined spaced relationship. Winding 10 includes first and second leads 16 and 18 integrally formed with turns 11 and extending axially thereof. Each lead 16 and 18 includes, according to the invention, a generally V-shaped crimp or knee 20 formed therein for securing the coil on a circuit board and for maintaining a precise position of the coil with respect to a circuit board on which the coil is mounted. Each knee 20 extends radially inward of the coil and is disposed with respect to the other knee and with respect to the mounting surface of coil form 12 to provide effective retention of the coil on a circuit board. Alternatively, each knee could extend radially outward to provide the intended mounting configuration (FIG. 2A). By use of the invention, the novel coil is retained in a desired circuit board position prior to soldering of the coil to the board, with the result that spurious coil movement is prevented prior to soldering. Thus, intended electrical characteristics of the coil are uniformly achieved in a completed circuit.

Figure 2:
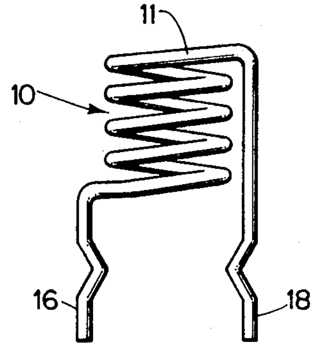
FIG. 2 is an elevation view of a preformed winding according to the invention prior to the molding thereof into a coil form.
Figure 3:
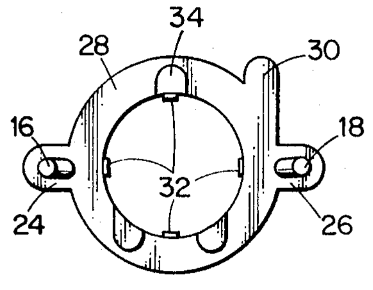
FIG. 3 is a bottom view of the coil of FIG. 1.
Figure 2A:
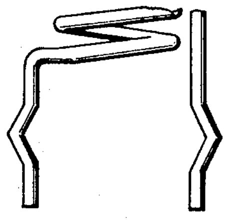
FIG. 2A is a cutaway view of an alternative preformed winding according to the invention.

The winding 10 is generally preformed to a desired electrical and mechanical configuration, as illustrated in FIG. 2, and the coil form 12 is molded onto winding 10, for example by an insert molding process. The winding is wound to precise dimensions to a tolerance of the same order of magnitude as the tolerance of the molded coil form, generally of the order of 0.0001 inch. The wire employed to form the winding 10 and its leads is, after molding onto coil form 12, sufficiently stiff to maintain predetermined lead positions with respect to each other and with respect to the associated coil form.

The coil form 12 is preferably formed of a plastic material such as polypropylene, having the desired electrical properties and which can be readily molded and set upon cooling. The coil form is of tubular configuration having predetermined inside and outside diameters and includes a helical groove 14 formed during molding by the presence of the winding 10 and arranged to accommodate the turns 11 of winding 10 in insulated spaced relation. A pair of diametrically opposed ribs 24 and 26, each extending radially outward of the coil form and disposed axially along the length thereof are provided for support of coil turns 11 within groove 14. The ribs 24 and 26 also rigidly secure leads 16 and 18 on the coil form to provide accurate spacing and positioning of the leads relative to each other and relative to the bottom surface 28 of coil form 12. As seen in FIG. 1, rib 24 encloses portion 17 of lead 16, while rib 26 encloses portion 19 of lead 18. Leads 16 and 18 as thus supported, are accurately and securely positioned with respect to each other such that each crimp 20 is correspondingly positioned to provide the intended retaining force for a mounted coil. The bottom surface 28 of coil form 12 includes a tangentially extending tab 30 adjacent lead 18 and which serves as a key for visual polarity indication. Polarity indication can also be provided by the unequal length of ribs 24 and 26. In the illustrated embodiment, rib 26 is longer than rib 24 and extends along the entire length of helical groove 14.

The tubular coil form may include a plurality of internal ribs 32 which extend axially of the coil form and which are circumferentially spaced from one another on the inner surface thereof. Ribs 32 are of generally rectangular cross section and are arranged to receive a tuning slug 33 in threaded relation therewith. Tuning slug 33 is made of a desired magnetic material, such as molded ferrite, and has a thread diameter slightly larger than the internal diameter of ribs 32 to permit the threading of the slugs onto ribs 32. The plastic material forming ribs 32 is sufficiently soft to allow the threads of slug 33 to form associated threads onto the ribs as the slug is turned into the coil form. As is known, the tuning slug can be positioned within the coil to provide the intended electrical characteristics.

Depending from the bottom surface 28 of coil form 12 are three mounting pads 34, each extending axially by a selected amount beyond the plane of surface 28 and positioned as illustrated about the periphery of surface 28. Pads 34 are configured and dimensioned to engage a mounting surface on a circuit board and to support the coil on the circuit board in predetermined disposition. The outermost surface of pads 34 define a mounting surface which is related to crimps 20 and 22 provided in leads 16 and 18 such that the crimps provide a retaining force to a coil installed on a circuit board to accurately maintain the position of the coil prior to the soldering thereof to the circuit board.

The coil form 12 is molded as a single integral element around the preformed winding 10 which is, during fabrication, supported within a suitable die. Multiple cavity dies are usually employed to simultaneously mold a plurality of coils.

As discussed hereinabove, winding 10 and coil form 12 are fabricated to precise dimensions, and location of the coil leads 16 and 18 relative to each other and with relation to the mounting surface of the coil form are provided to achieve effective mechanical retention of the coil when installed in a circuit board. The holes in the circuit board through which the novel coil is inserted have the same center-to-center spacing as the center-to-center spacing of the leads 16 and 18, and are dimensioned to provide sufficient clearance for a push fit of the knee of the lead wires to pass through the hole to a distance beyond the center of the knee. A holding force is thereby provided sufficient to prevent retraction or tilting of the coil in the presence of spurious forces which may be encountered during circuit assembly. The knees 20 of the leads 16 and 18 extend radially inward toward one another, and a holding force is provided inwardly toward the axis of the coil and outwardly from the mounting surface to maintain the coil in fixed position on an associated circuit board. The retaining force can alternatively be provided with knees 20 extending radially outward, as illustrated in FIG. 2A. The angular disposition of the portion 40 of knee 20 nearest the surface 28 is determined in accordance with the distance between the point 42 from which each lead exits from surface 28 and the surface of the bottom side of the circuit board to achieve the intended retaining force. The angular disposition of portion 44 of knee 20 is selected to permit a desired insertion force for seating leads 16 and 18 into the circuit board. The position of knee 20 on its lead is selected to permit the vertex 21 of the knee to extend slightly beyond the bottom surface of the circuit board when the coil is installed thereon.

In a typical coil constructed according to the invention, winding 10 is formed of 0.032 inch diameter tinned copper wire with a pitch of 22 turns per inch on a 0.320 inch coil form diameter. The V-shaped knee 20 is formed in leads 16 and 18 with portions 40 and 44 each disposed inwardly at an angle of 24° relative to the longitudinal coil axis. Leads 16 and 18 extend from surface 28 by 0.30 inch, while the vertex 21 of each knee 20 is 0.084 inch from surface 28. Pads 34 extend from surface 28 by 0.03 inch. Leads 16 and 18 are on a 0.239 inch radius relative to the coil axis. As discussed, the mounting holes for the coil on the circuit board should be on the same radius as the coil leads and should provide clearance for insertion of the coil with a push fit. The mounting holes for the embodiment described herein are of 0.045 inch diameter and provide sufficient clearance for positive seating of the coil.

Figure 4:
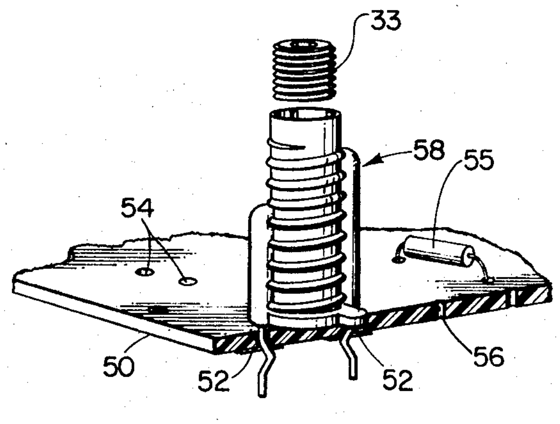
FIG. 4 is a cutaway pictorial view illustrating the mounting of a coil embodying the invention on a circuit board.
Figure 5:
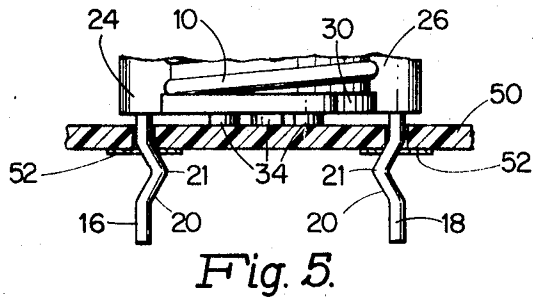
FIG. 5 is a cutaway elevation view illustrating a coil according to the invention mounted on a circuit board.

The coil as mounted on a circuit board is illustrated in FIGS. 4 and 5. Circuit board 50 is formed of a sheet of insulative material having conductive circuit paths 52 formed on a surface thereof by well-known masking and etching techniques. Openings 54 are provided through board 50 in selected regions thereof for insertion of electrical components such as resistor 55. Typically, the components are mounted on the surface of board 50 opposite the surface containing conductive paths 52. Openings 56 are provided for insertion of a coil 58 in positive engagement with circuit board 50 in accordance with the invention. Pads 34 engage the confronting surface of board 50, and knees 20 are disposed in respective openings 56 with the vertex 21 of each knee 20 extending slightly beyond the surface of board 50 opposite to the surface on which the coil is seated.

The unique lead configuration provides a retaining force for securely maintaining coil 58 in its intended position on circuit board 50. After assembly of coil 58 and other electrical components comprising the desired circuit, the components including coil 58 can be soldered to associated terminal paths provided on the surface of board 50 in conjunction with conductive paths 52, such soldering usually being accomplished in a single operation employing well known flow soldering techniques. The invention can be employed with a variety of well known circuit boards. For example, the circuit board may be of the multilayer type in which use of the mounting holes 56 provided for receiving coil 58, as well as other mounting holes 54 provided for receipt of other components, can be plated-through holes providing electrical connection between conductive circuit paths on one surface of board 50 and selected conductive paths provided on the opposite surface of the board.

It will be appreciated that the invention provides an improved coil adapted to be maintained at a predetermined position on a circuit board. Spurious movement of the coil during assembly is substantially eliminated by the novel coil construction, which also permits efficient mass production without the need for ancillary mounting hardware or the need for additional assembly steps to provide rigid coil mounting on a circuit board. The invention is not limited to the particular embodiment illustrated but can be embodied in a variety of coil configurations to suit particular operating requirements. For example, multiple windings can be provided with integrally formed leads provided for each winding and having the novel lead configuration for rigid and accurate coil mounting. In some instances, it may be desirable to provide a coil of horizontal disposition with the leads depending radially therefrom rather than the vertical disposition illustrated. Various other configurations and alternative implementations will occur to those versed in the art, and it is not intended to limit the invention by what has been particularly shown and described.

What is claimed is:

1. A coil adapted for mounting in predetermined spaced openings in a circuit board of predetermined thickness said coil comprising:
   - a winding of conductive wire;
   - first and second leads integrally formed with said winding and depending therefrom to provide electrical connection to said coil and mechanical support therefor;
   - a tubular coil form having a helical groove in the outer surface thereof and extending along at least a portion of the length thereof, said coil form being integrally formed with said winding and having a mounting s$rface on one end thereof for engagement with the upper surface of said circuit board;
   - first and second elongated ribs integrally formed with and outwardly extending from said coil form and each disposed axially along the length of said coil form over said winding for support of said winding in said helical groove and respectively surrounding the portions of said first and second leads immediately adjacent said mounting surface and rigidly securing said leads in predetermined position relative to each other at said mounting surface thereby to define rigid leads accurately spaced in alignment with said spaced circuit board openings when said coil is mounted on said circuit board with said leads inserted in associated mounting holes;
   - each of said leads having a generally V-shaped knee disposed at a predetermined position outwardly of said mounting surface and extending radially of said coil with a first portion adjacent said mounting surface disposed angularly from the axis of the associated lead to an extent to provide a predetermined retaining force on the bottom surface of said circuit board when inserted in said associated mounting hole, and a second portion adjacent said first portion and of opposite angular disposition to provide a predetermined insertion force;

the vertex of said knee extending beyond the bottom surface of the associated circuit board when said coil leads are fully inserted in said associated mounting holes with said mounting surface in intimate engagement with the upper surface of said circuit board.

2. A coil according to claim 1 wherein said first and second leads are disposed axially of said winding and depend axially from said mounting surface; and said first and second elongated ribs are disposed radially of said tubular coil form and respectively surround the portions of said first and second axially disposed leads above said mounting surface.

3. A coil according to claim 1 wherein said coil form includes a plurality of mounting pads extending by a predetermined amount beyond one end of said coil form and defining said mounting surface.

4. A coil according to claim 3 wherein said elongated ribs are of unequal length for polarity indication.

* * * * *